United States Patent
Twait (10) Patent No.: US 7,385,605 B2
(45) Date of Patent: Jun. 10, 2008

(54) COMPUTER DISPLAY SYSTEM FOR DYNAMICALLY MODIFYING STACKED AREA LINE GRAPHS TO CHANGE THE ORDER OR PRESENCE OF A SET OF STACKED AREAS IN THE GRAPH RESPECTIVELY REPRESENTATIVE OF THE PROPORTIONS CONTRIBUTED TO A TOTAL BY EACH OF A SET OF TIME DEPENDENT VARIABLES

(75) Inventor: Joshua Gunnar Twait, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 10/728,165

(22) Filed: Dec. 4, 2003

(65) Prior Publication Data

US 2005/0122325 A1 Jun. 9, 2005

(51) Int. Cl.
*G06T 11/20* (2006.01)
(52) U.S. Cl. .................................................. 345/440
(58) Field of Classification Search ......... 345/440–441
See application file for complete search history.

(56) References Cited

U.S. PATENT DOCUMENTS

| | | | | |
|---|---|---|---|---|
| 5,461,708 A | * | 10/1995 | Kahn | 345/440 |
| 5,611,034 A | * | 3/1997 | Makita | 345/440 |
| 5,615,323 A | * | 3/1997 | Engel et al. | 345/440 |
| 5,633,997 A | * | 5/1997 | Barber et al. | 345/440 |
| 6,085,202 A | * | 7/2000 | Rao et al. | 715/509 |
| 6,356,285 B1 | * | 3/2002 | Burkwald et al. | 715/853 |
| 6,429,868 B1 | * | 8/2002 | Dehner et al. | 345/440 |
| 6,466,211 B1 | * | 10/2002 | Havre et al. | 345/440 |
| 6,473,084 B1 | * | 10/2002 | Phillips et al. | 345/440 |
| 6,590,577 B1 | * | 7/2003 | Yonts | 345/440 |
| 6,750,864 B1 | * | 6/2004 | Anwar | 345/440 |
| 2004/0205726 A1 | * | 10/2004 | Chedgey et al. | 717/125 |

(Continued)

OTHER PUBLICATIONS

"Available chart types". For Microsoft Excel 2003, from Microsoft Office Assistance. From Microsoft web site, pp. 1-2.*

(Continued)

*Primary Examiner*—Ryan Yang
(74) *Attorney, Agent, or Firm*—Jerry B. Kraft; Jeffrey S. LaBaw; Libby Z Handelsman (57) ABSTRACT

Graphically displaying the proportion of a total value of a time dependent variable contributed by each of a set of elements. Applicable in a graph environment comprising the steps of displaying the proportion contributed by each element as an area within an ordered set of areas under a line representative of the total value of said time dependent variable. The user is enabled to interactively select one area in the set of areas and perform one of the following operations: hiding the selected area, displaying the selected area or reordering the position of the selected area within said ordered set responsive to said user selection. This implementation is effective in the manipulation of stacked area line graphs by visualizing how the various areas representative of the contributions of the individual elements to the whole time dependent variable affect and coact with the other variables in the set.

24 Claims, 7 Drawing Sheets

U.S. PATENT DOCUMENTS

2005/0088441 A1* 4/2005 Hao et al. .................... 345/440
2005/0093866 A1* 5/2005 Ebert .......................... 345/440

OTHER PUBLICATIONS

"Microsoft Excel XP—Charts". Author unknown. University of Southern California, Feb. 12, 2003. 47 pages.*

Thurott, Paul. "Office 2003 Prices, Release Date Revealed". Aug. 13, 2003.*

Simon, Jinger. 'Excel 200 in a Nutshell'. O'Reilly & Associates. 2001. Available at O'Reilly website.☐☐.*

Dodge, Mark and Craig Stinson. Sample chapter of"Running Microsoft Excel 2000." Published May 7, 1999. Microsoft Learning /Microsoft Press. Web page has "last updated" date of Jul. 6, 2001. See http://www.microsoft.com/mspress/books/sampchap/2050.aspx. Book.*

* cited by examiner

COMPUTER DISPLAY SYSTEM FOR DYNAMICALLY MODIFYING STACKED AREA LINE GRAPHS TO CHANGE THE ORDER OR PRESENCE OF A SET OF STACKED AREAS IN THE GRAPH RESPECTIVELY REPRESENTATIVE OF THE PROPORTIONS CONTRIBUTED TO A TOTAL BY EACH OF A SET OF TIME DEPENDENT VARIABLES

TECHNICAL FIELD

The present invention relates to the display of graphs in interactive computer controlled display systems and particularly to the display of stacked area graphs.

BACKGROUND OF RELATED ART

Computers and their application programs are used in all aspects of business, industry and academic endeavors. In recent years, there has been a technological revolution driven by the convergence of the data processing industry with the consumer electronics industry. This advance has been even further accelerated by the extensive consumer and business involvement in the Internet. As a result of these changes, it seems as if virtually all aspects of human productivity in the industrialized world require human/computer interaction. The computer industry has been a force for bringing about great increases in business and industrial productivity.

In addition, the computer and computer related industries have benefitted from a rapidly increasing availability of data processing functions. Along with this benefit comes the problem of how to present the great number and variety of available elements to the interactive operator or user in display interfaces that are relatively easy to use. For many years, display graphs have been a widely used expedient for helping the user to keep track of and to organize and present operative and available functions and elements on computer controlled display systems. Computer displayed graphs have been used to help the user or the user's audience visualize and comprehend elements, and particularly graphical elements that represent variables, e.g. time dependent variables. For Example, XXX Inc. has sales in Austin, Houston and Dallas over a given period of time. The individual sales in each of the three cities are time dependent variables. The respective sales are elements that, when totalled, provide the total sales of XXX, which is itself a time dependent variable. In another example, the total temperature of a chemical reaction of a given time period is a time dependent variable. If the total temperature is the result of temperatures contributed by three subprocesses, Temps. of A+B+C=T (total) over the time period being measured, then Temps: A, B and C are elements that, when totalled, provide the total time dependent temperature.

Time dependent systems in which a set of individual time dependent variables each contribute to an overall time dependent total are most effectively viewed and presented on displays as stacked area line graphs with the X axis as the baseline along which time is tracked. With such an arrangement, the total of the time dependent variable, e.g. temperature, will be the variable upper line in the graph; and each of the elements (subprocesses) contributing temperature will appear on the stacked area graph as areas or layers, the thickness of which is a visualization of the contribution of the element to the overall total temperature.

While such systems in which the set of elements each contribute to the overall time dependent total may be very effectively presented in the stacked area line graphs as described above, there has not been an effective system or method for manipulating the individual contributing elements as represented by the layers or areas in the stack.

SUMMARY OF THE PRESENT INVENTION

The present invention provides a user friendly display interface that facilitates the presentation and manipulation of a computer displayed stacked area line graph. Accordingly, the broadest aspect of this invention provides a computer implemented user interactive system, method and computer program for graphically displaying the proportion of a total value of a time dependent variable contributed by each of a set of elements. The invention is applicable in a graph environment comprising the steps of displaying the proportion contributed by each element as an area within an ordered set of areas under a line representative of the total value of said time dependent variable. In the invention, the user is enabled to interactively select one area in the set of areas and perform one of the following operations: hiding the selected area, displaying the selected area or reordering the position of the selected area within said ordered set responsive to said user selection. This implementation is effective in the manipulation of stacked area line graphs by visualizing how the various areas representative of the contributions of the individual elements to the whole time dependent variable affect and coact with the other variables in the set. An area may be hidden, i.e. removed from the graph, and one or more of the remaining displayed areas reformed so as to represent the resulting change of said reformed area within said ordered set of stacked areas. Likewise, the effects of adding another time dependent variable element represented by a new area not previously in the area graph may be visualized by inserting the new area and reforming the other areas to absorb this new contribution. Also, the areas in the stack may be ordered resulting in the reforming of up to all of the areas in the stacked graph. The latter is a particularly effective tool when the user wishes to see a direct graph of the area ordered lowermost in the graph with respect to the X-axis which functions as the time line.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
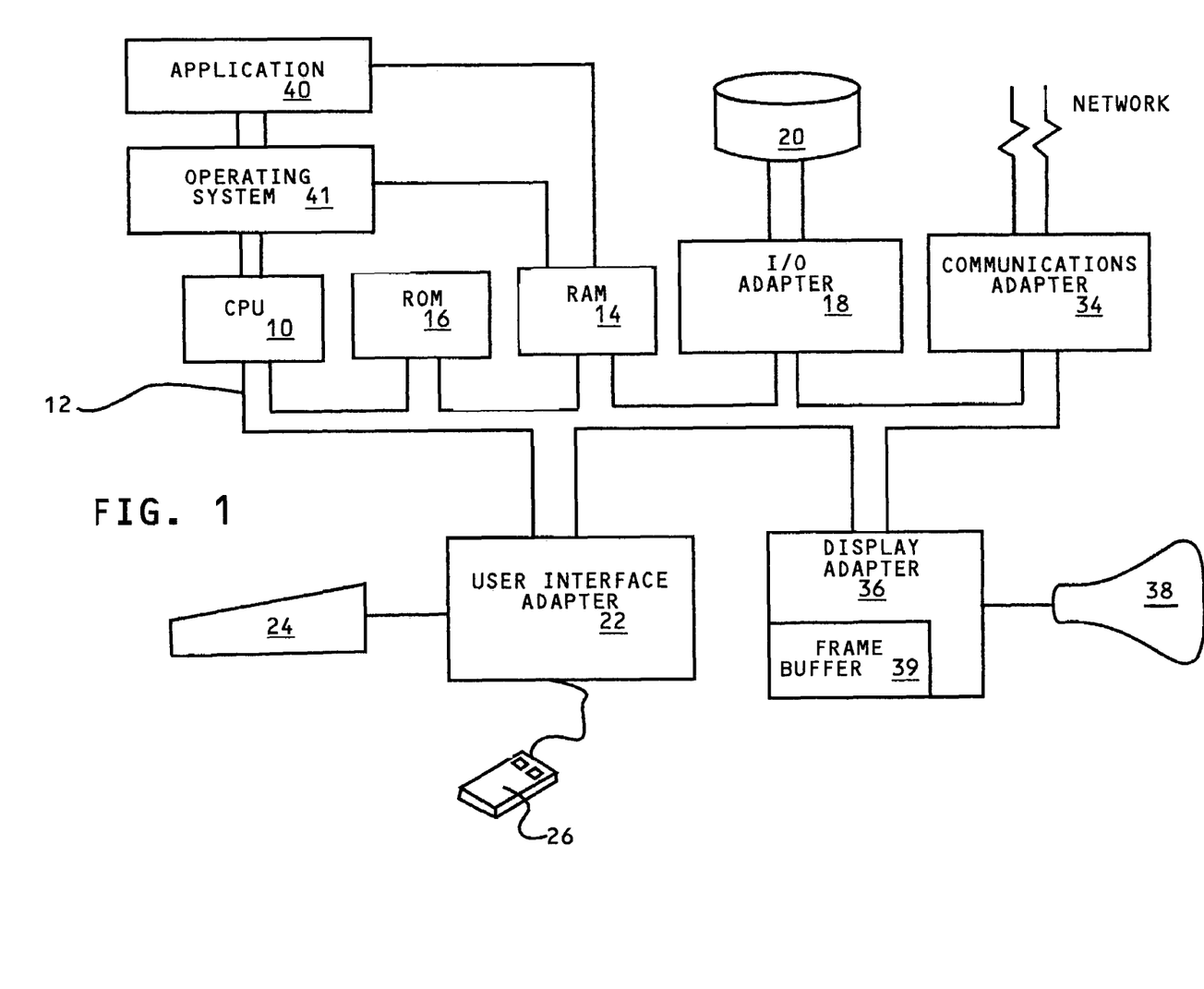
FIG. 1 is a block diagram of a interactive data processing display system including a central processing unit that is capable of displaying and implementing the stacked area line graph manipulations of the present invention.

Referring to FIG. 1, a typical data processing computer controlled display is shown that may function as a basic computer controlled Web receiving terminal used in implementing the present invention for displaying and manipulating stacked area line graphs. A central processing unit (CPU) 10, such as one of the PC microprocessors or workstations, e.g. RISC System/6000™ series available from International Business Machines Corporation (IBM), or Dell PC microprocessors, is provided and interconnected to various other components by system bus 12. An operating system 41 runs on CPU 10, provides control and is used to coordinate the function of the various components of FIG. 1. Operating system 41 may be one of the commercially available operating systems, such as IBM's AIX 6000™ operating system or Microsoft's WindowsXP™ or Windows2000™, as well as UNIX and other IBM AIX operating systems. Application programs 40, controlled by the system, are moved into and out of the main memory Random Access Memory (RAM) 14. These programs include the programs of the present invention for the generation and manipulation of stacked area line graphs that will be described hereinafter. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside Internet or Web network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs of this invention. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through keyboard 24 or mouse 26 and receiving output information from the system via display 38.

The present invention involves the manipulation rather than the creation of stacked area graphs on computer controlled displays. Stacked area graphs are conventionally generated so that the displayed areas representative of the elements being presented are displayed curves generated from a vector or from separate columns in a matrix. The area function plots the values in each column of a matrix representative of all the curves in the stack as individual separate curves and then fills in the area between the lowest curve and the baseline X-axis, and then between the sequentially higher curves and each other to produce stacked curves showing the contribution of each row element (in the following matrix for example) to the total height of the curve at each X interval.

$$Y = \begin{bmatrix} 1 & 6 & 3 \\ 3 & 2 & 7 \\ 1 & 5 & 4 \\ 2 & 6 & 2 \end{bmatrix};$$

With this matrix, a stacked graph may be produced with three graph areas, i.e. one per column, wherein the height of the area graph is the sum of the elements in each row and each successive curve uses the preceding curve as its base.

Figure 2:
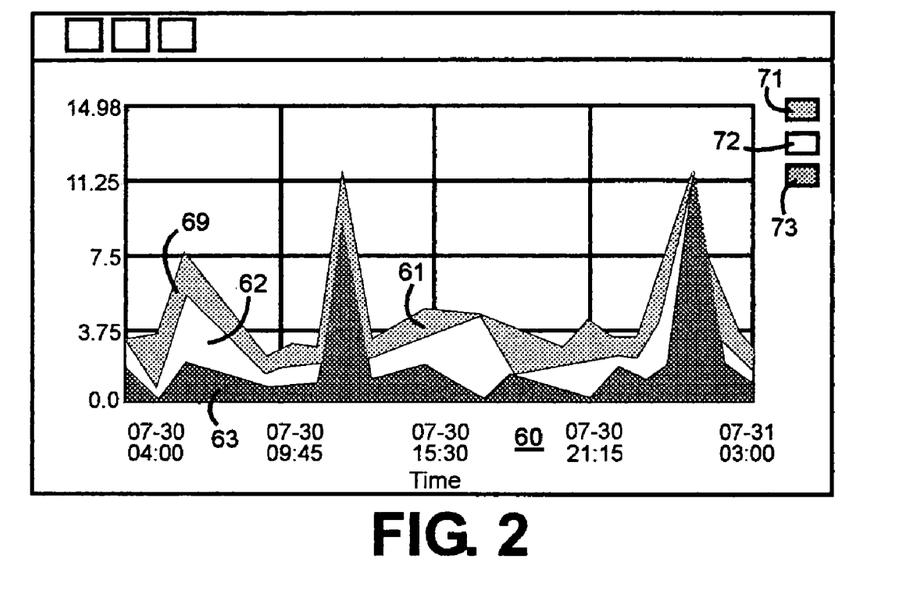
FIG. 2 is a diagrammatic view of a display screen illustrating a stacked area line graph showing the contributions of three time dependent variable elements as represented by a set of three areas to a whole time dependent variable.

The somewhat more complex three area stacked area line graph on the display screen 60 illustrated in FIG. 2 is formed in this manner. The stacked areas 63 at the X-axis baseline and sequentially superimposed areas 62 and 61 represent elements that are time dependent variables, such as temperature components contributed by each of a set of chemical processes (elements) to a total temperature line 64 over a 24 hour period during which the process is being monitored. Each of the set of areas 61 through 63 is respectively controlled through a corresponding icon 71 through 73 through which the areas 61 through 63 may be manipulated in accordance with the invention. For example, in FIG. 3 icon 73 in FIG. 2 has been pointed to and clicked on via a mouse. This has caused area 63 to become hidden or removed from the display in FIG. 3 and the two remaining areas, 61 and 62, have been redrawn according to the stacked area rules outlined above so that area 62 is now at the baseline X-axis and area 61 extends above area 62. Icon 73 is now displayed in outline 75 to represent that area 63 is hidden. Now, if the user wishes to redisplay hidden area 63, icon outline 75 may be clicked on and the stacked graph will be reformed to the graph illustrated in FIG. 2.

Figure 3:
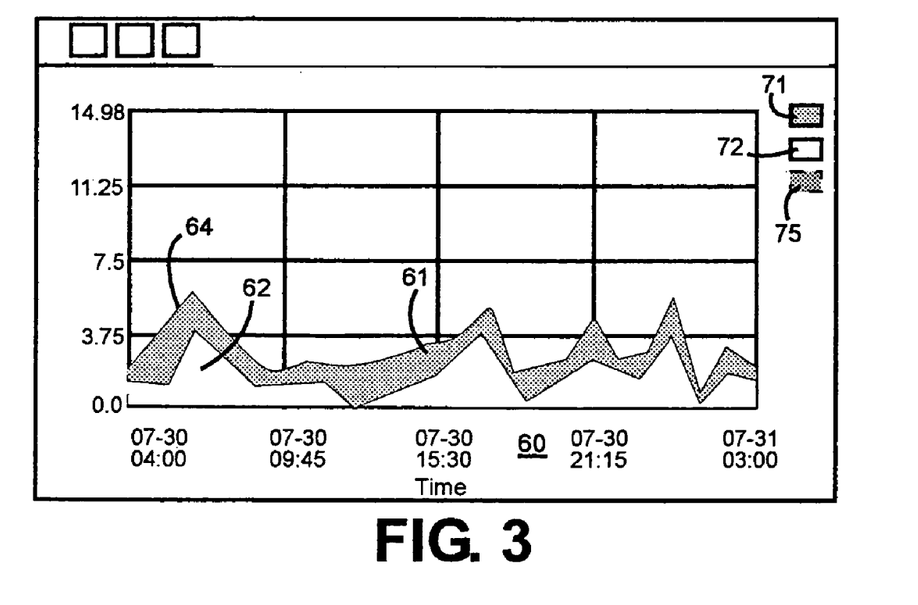
FIG. 3 is the view of the graph of FIG. 2 to show the effect of hiding one of the stacked areas.
Figure 4:
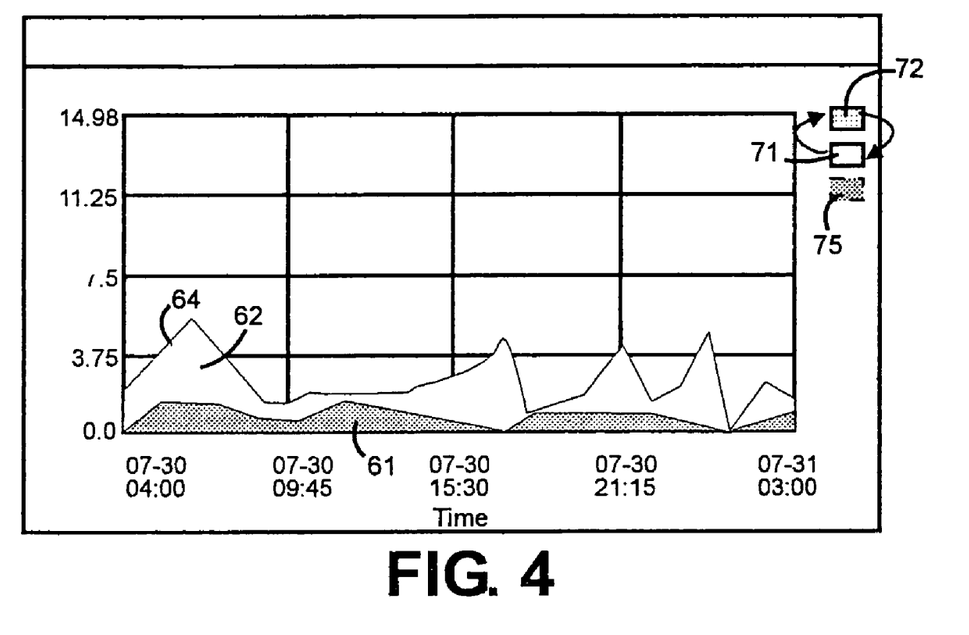
FIG. 4 is the view of the graph of FIG. 2 to show the effect of reordering the sequence of the graphic areas, as well as how the icons representing the respective areas may be manipulated to effect the reordering.

The areas in the stack may be reordered to any suitable order in accordance with the user's needs. FIG. 4 illustrates how the areas may be reordered. For simplicity in illustration, the reordering will be shown using the two area stacked graph of FIG. 3. However, it will be understood that the same icon reordering movements may be used even if there are three or four stacked areas. The bottom to top order of the icons controls the same bottom to top order of the areas respectively represented by the icons. Thus, when the positions of icons 71 and 72 are switched in FIG. 4 as indicated by the arrow lines so that icon 72 is now above icon 71, there will be a corresponding reordering of stacked areas so that area 62 is now above area 61. Line 64, which represents the total temperature, remains unaffected by the change since no temperature component was added to or removed from the stack.

Figure 5:
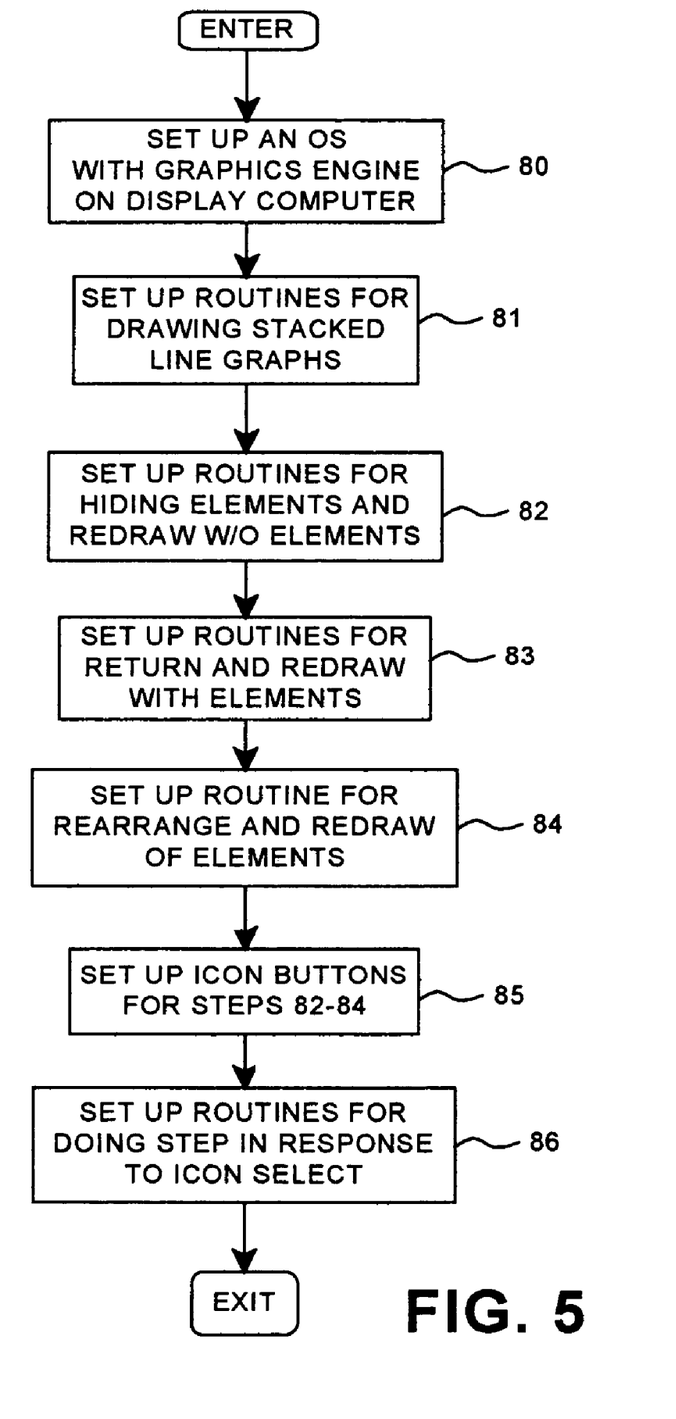
FIG. 5 is an illustrative flowchart describing the setting up of the elements of a program according to the present invention for dynamic manipulation and reformation of the areas in a stacked area graph.

Now, with reference to FIG. 5, we will describe a process implemented by a program according to the present invention for dynamically manipulating the areas in a displayed stacked area graph. The program routines that are created by the process of FIG. 5 implement the operations described with respect to FIGS. 2 through 4. In a computer controlled display terminal as described in FIG. 1, there is provided an operating system with a graphics engine, e.g. the graphics/text functions of Windows 2000™, which in turn translates the vectors provided for the areas in a stacked area graph into dynamic pixel arrays providing the stacked graphs, step 80. A routine is set up for drawing stacked area line graphs on the user display, step 81. Then, routines are provided for hiding one of the areas in the stacked graph and for then regenerating the displayed stacked line graph to show such a modification, step 82. Likewise, a routine is provided for adding the hidden area back into the stacked graph and for then regenerating the displayed stacked line graph to show such a modification, step 83. Finally, a routine is provided for changing the order of the areas or elements in the stacked graph and for then regenerating the displayed stacked line graph to show such a reordering modification, step 84. There is also provided, step 85, a set of displayed icon buttons, each representing an element in the stack, as described in FIGS. 2 through 4 above, so that the user is enabled to modify the stacked line graph by carrying out steps 82 through 84 through pointing and clicking on the icon buttons. Also set up are routines responsive to the selection of an icon button for carrying out the step represented by the selected icon, step 86.

Figure 6:
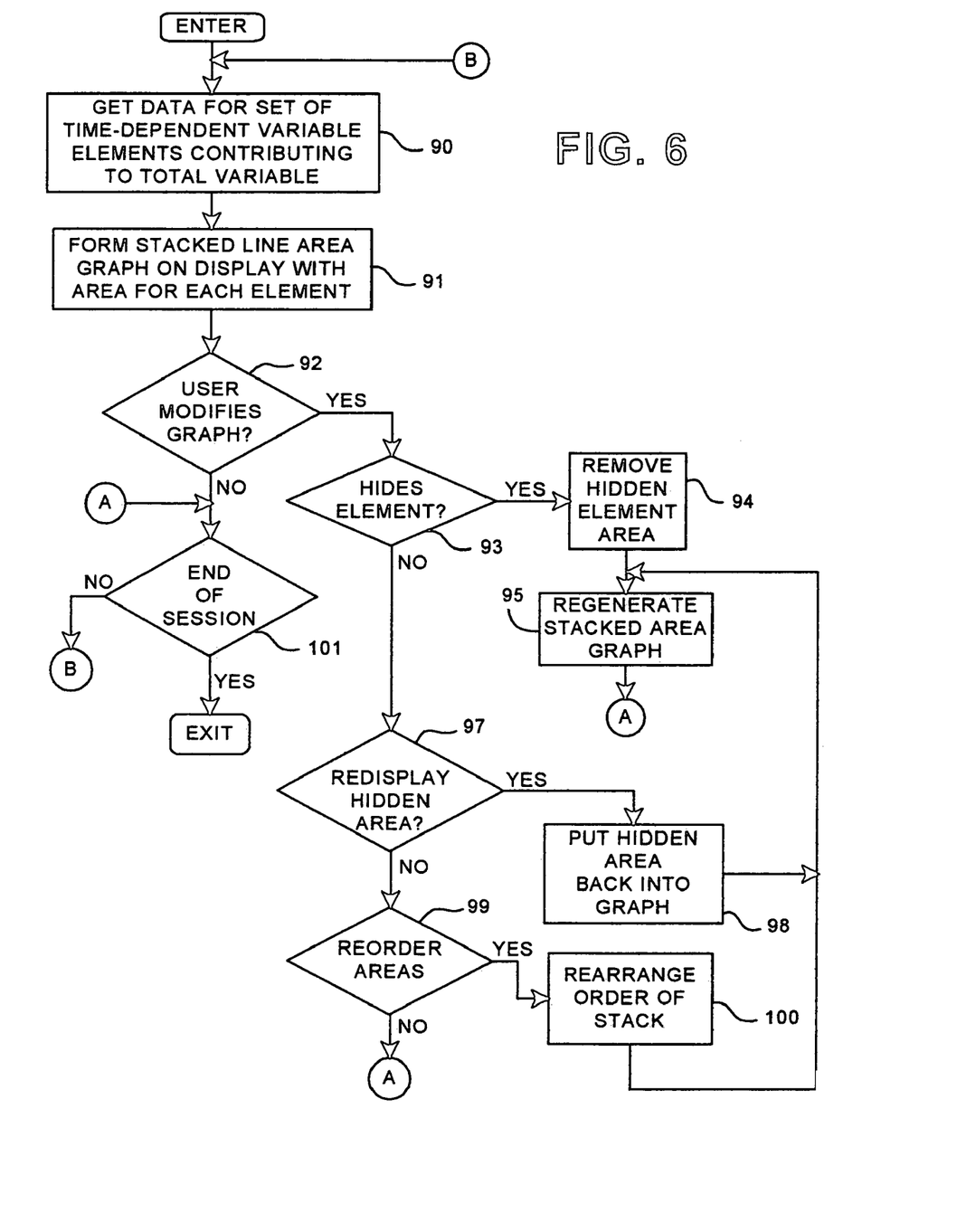
FIG. 6 is a flowchart of an illustrative run of the program set up in FIG. 5.

The running of the process set up in FIG. 5 and described in connection with FIGS. 2 through 4 will now be described with respect to the flowchart of FIG. 6. First, at a computer controlled display terminal, data is obtained for a set of time dependent variables that contribute to a total time dependent variable, step 90. Then, from this information, a stacked area graph is formed and displayed, step 91. First, step 92, a determination is made as to whether the user is modifying the stacked graph. If Yes, then a further determination is made as to whether the modification involves hiding an element or area in the stack, step 93. If Yes, the hidden element is removed from the stacked graph, step 94, and the stacked area graph is regenerated to reflect the change, step 95. If the determination in step 93 is No, then a further determination is made as to whether the user has selected to redisplay a hidden graph area, step 97. If Yes, the hidden area is reinserted into the stacked graph, step 98, and the process is returned to step 95 where the stacked area graph is regenerated to reflect the change. If the determination in step 97 is No, then a further determination is made as to whether the user has selected to reorder the area in the stacked graph, step 99. If Yes, the order of the stack is changed, step 100, as described above with respect to FIG. 4, and the process is returned to step 95 where the stacked area graph is regenerated to reflect the change. After step 95, or if the determination in step 99 is No, the process is branched to step 101 via branch "A" where a determination is made as to whether the session is at an end. If Yes, the session is exited. If No, the process is returned to initial step 90 via branch "B".

Figure 7:
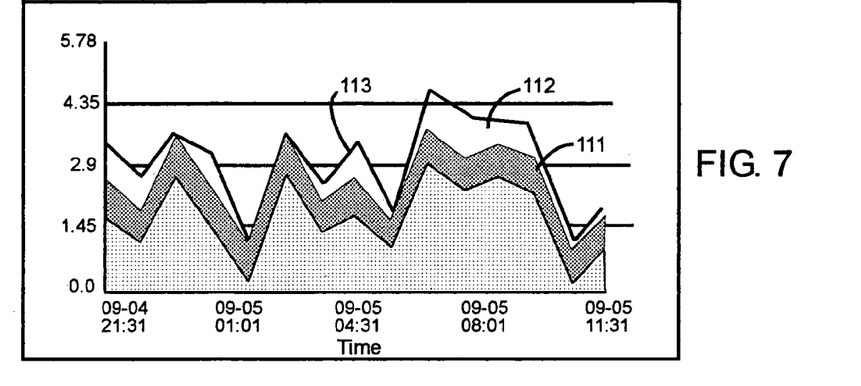
FIGS. 7 through 11 show the visualization sequence on the display when a stacked area graph like that of FIG. 2 is morphed through an animated sequence to a graph like that of FIG. 3 wherein a single area is shown along the X-axis.
Figure 8:
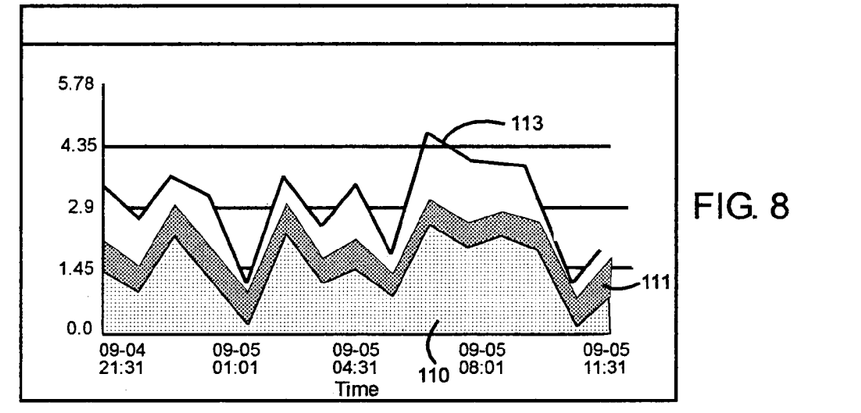
Figure 9:
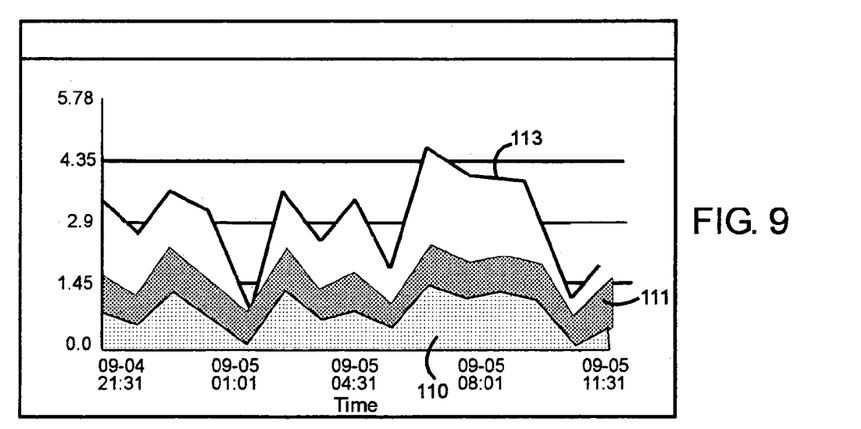
Figure 10:
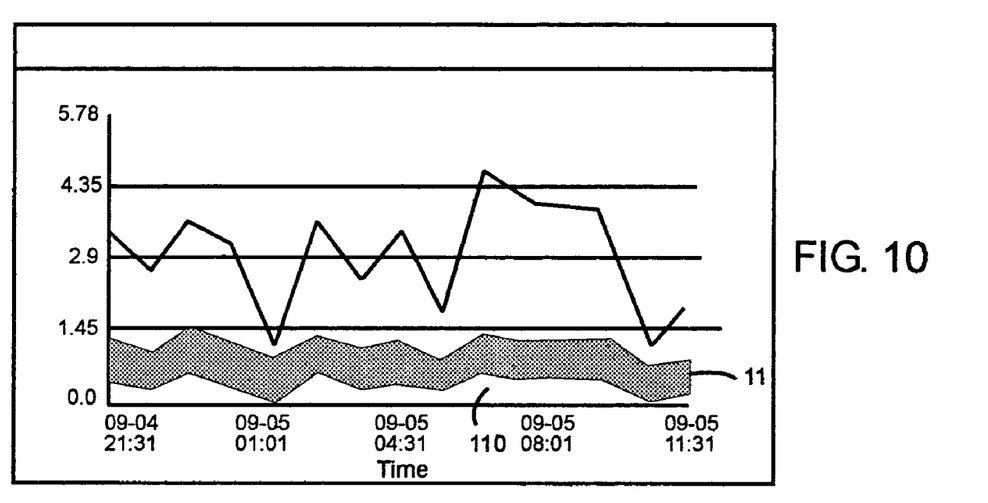
Figure 11:
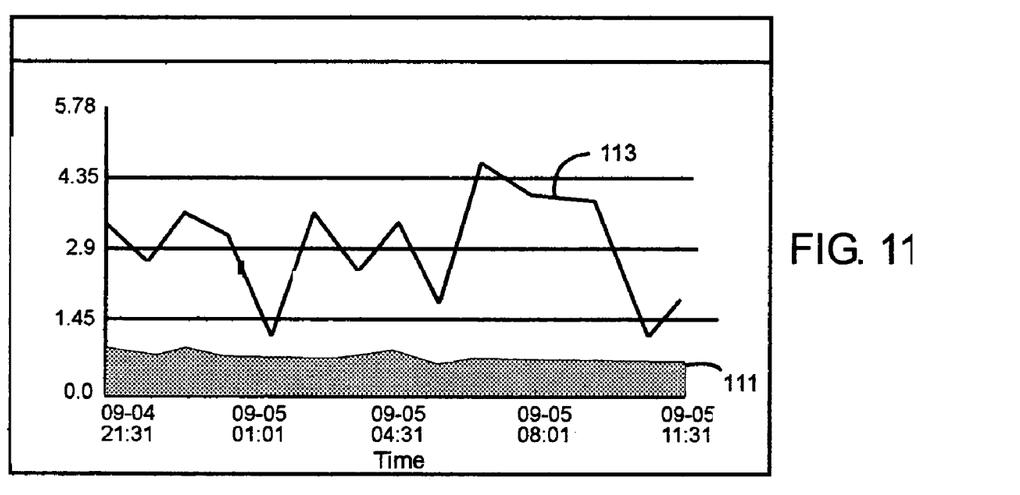

As set forth above, an important aspect of the present invention is the enabling of the user or viewer to visualize the effects of the operations performed on the areas representative of the elements that contribute to the overall total. With FIGS. 2 and 3 above, the visualized effect was presented in a static manner with FIG. 2 showing the initial state and FIG. 3 showing the state of the stacked graph upon the completion of the operation. With conventional image morphing techniques currently available, such as those described in the text, *Bitmapped Graphics,* Igor Chebotko et al., published 1994, revised 2003, Wrox Press (available on the Web at: www.computerbooksonline.com), it is possible to animate the transition between the image of the stacked graph before the selected operation is carried out and the stacked graph after the operation is completed. This is illustrated by FIGS. 7 through 11. FIG. 7 is an illustration of the displayed initial stacked graph. It has three stacked areas 110, 111 and 112. Each area represents an element that contributes to the total value of the time dependent variable as indicated by line 113. The operation selected to be performed on the graph of FIG. 7 is to hide areas 110 and 112 so that in FIG. 11 area 111 will remain as the bottom area so that it may be measured with respect to the baseline or X axis. The transition of the stacked graph between FIGS. 7 and 11 is animated as shown via FIGS. 8, 9 and 10. This animation enhances user interest and comprehension through this animated visualization.

One of the preferred implementations of the present invention is in application program 40, i.e. a browser program made up of programming steps or instructions resident in RAM 14, FIG. 1, of a Web receiving station and/or Web server during various Web operations. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A computer implemented user interactive method for graphically displaying the proportion of a total value of a time dependent variable contributed by each of a set of elements comprising the steps of:

displaying the proportion contributed by each element of the same time dependent variable as an area within an ordered set of areas under a line representative of the total value of said time dependent variable;

enabling the user to interactively select one of said set of areas; and performing a selected operation selected from the group consisting of hiding the selected area, displaying the selected area and reordering the position of the selected area within said ordered set responsive to said user selection.

2. The method of claim 1 wherein said ordered set of areas under said line comprises a stacked area graph formed by said ordered set of areas under said line.

3. The method of claim 2 wherein:

the selected operation performed is hiding the selected area; and further including the step, responsive to said hiding step, of reforming at least one of the remaining displayed areas so as to represent the resulting change of said reformed area within said ordered set of stacked areas.

4. The method of claim 2 wherein:

the selected operation performed is displaying a selected undisplayed area; and further including the step, responsive to said step of displaying, of reforming at least one of the other displayed areas so as to represent the resulting change of said reformed area within said ordered set of stacked areas.

5. The method of claim 2 wherein:

the selected operation performed is reordering the position of the selected area within said ordered set; and further including the step, responsive to said step of reordering the position of the selected area within said ordered set, of reforming at least one of the other displayed areas so as to represent the resulting change of said reformed area within said reordered set of stacked areas.

6. The method of claim 2 further including the step of:
displaying a plurality of icons each representative of one of said areas whereby the user may select one of said areas by selecting the icon representative of the selected area.

7. The method of claim 2 further including the step of:
displaying a plurality of icons each representative of one of said areas whereby the user may reorder the position of the selected area by reordering the position of the selected icon representative of the selected area.

8. A data processor controlled user interactive display system for graphically displaying the proportion of a total value of a time dependent variable contributed by each of a set of elements comprising:
means for displaying the proportion contributed by each element of the same time dependent variable as an area within an ordered set of areas under a line representative of the total value of said time dependent variable;
means for enabling the user to interactively select one of said set of areas; and
means for performing a selected operation selected from the group consisting of hiding the selected area, displaying the selected area and reordering the position of the selected area within said ordered set responsive to said user selection.

9. The display system of claim 8 wherein said ordered set of areas under said line comprises a stacked area graph formed by said ordered set of areas under said line.

10. The display system of claim 9 wherein:
the selected operation performed is hiding the selected area; and
further including means, responsive to said hiding operation, for reforming at least one of said remaining displayed areas so as to represent the resulting change of said reformed area within said ordered set of stacked areas.

11. The display system of claim 9 wherein:
the selected operation performed is displaying a selected undisplayed area; and
further including means, responsive to said displaying of said undisplayed area, for reforming at least one of the other displayed areas so as to represent the resulting change of said reformed area within said ordered set of stacked areas.

12. The display system of claim 9 wherein:
the selected operation performed is reordering the position of the selected area within said ordered set; and
further including means, responsive to said means for reordering the position of the selected area within said ordered set, for reforming at least one of the other displayed areas so as to represent the resulting change of said reformed area within said reordered set of stacked areas.

13. The display system of claim 9 further including a plurality of icons on said display each representative of one of said areas whereby the user may select one of said areas by selecting the icon representative of the selected area.

14. The display system of claim 9 further including:
a plurality of icons on said display each representative of one of said areas; and means enabling the user to interactively reorder the position of the selected area by reordering the position of the selected icon representative of the selected area.

15. The method of claim 2 wherein said selected operation is performed by morphing the displayed snacked area graph through an animated display sequence of stacked graphs.

16. The display system of claim 9 wherein said means for performing said selected operation, perform the operation by morphing the displayed stacked area graph through an animated display sequence of stacked graphs.

17. A computer readable medium having a computer readable program stored therein for graphically displaying the proportion of a total value of a time dependent variable contributed by each of a set of elements, wherein the computer readable program when executed on a computer causes the computer to:
display the proportion contributed by each element of the same time dependent variable as an area within an ordered set of areas under a line representative of the total value of said rime dependent variable;
enable the user to interactively select one of said set of areas; and
perform a selected operation selected from the group consisting of hiding the selected area, displaying the selected area and reordering the position of the selected area within said ordered set responsive to said user selection.

18. The computer readable medium of claim 17 wherein said ordered set of areas under said line comprises a stacked area graph formed by said ordered set of areas under said line.

19. The computer readable medium of claim 18 wherein said computer program causes the computer to:
perform the selected operation of hiding the selected area; and
responsive to said hiding, reform at least one of the remaining displayed areas so as to represent the resulting change of said reformed area within said ordered set of stacked areas.

20. The computer readable medium of claim 18 wherein said computer program causes the computer to:
perform the selected operation of displaying a selected undisplayed area; and
responsive to displaying said undisplayed area, reform at least one of the other displayed areas so as to represent the resulting change of said reformed area within said ordered sec of stacked areas.

21. The computer readable medium of claim 18 wherein said computer program causes the computer to:
perform the selected operation of reordering the position of the selected area within said ordered set; and
responsive to said reordering, reform at least one of the other displayed areas so as to represent the resulting change of said reformed area within said reordered set of stacked areas.

22. The computer readable medium of claim 18 wherein said computer program further causes the computer to:
display a plurality of icons each representative of one of said areas to enable the user to select one of said areas by selecting the icon representative of the selected area.

23. The computer readable medium of claim 18 wherein said computer program further causes the computer to:

displaying a plurality of icons each representative of one of said areas to enable the user to reorder the position of the selected area by reordering the position of the selected icon representative of the selected area.

24. The computer readable medium of claim 18 wherein said computer program further causes the computer to:

enable the user no morph the displayed stacked area graph through an animated display sequence of stacked graphs.

* * * * *